United States Patent [19]

Arendt

[11] 4,422,443
[45] Dec. 27, 1983

[54] SOLAR COLLECTOR

[76] Inventor: John E. Arendt, Rte. #1 Box 126, Chaffee, Mo. 63740

[21] Appl. No.: 260,713

[22] Filed: May 5, 1981

[51] Int. Cl.³ .............................................. F24J 3/02
[52] U.S. Cl. ................................... 126/418; 126/419; 126/450; 126/422
[58] Field of Search ............... 126/419, 418, 422, 450, 126/444

[56] References Cited

U.S. PATENT DOCUMENTS

| | | | |
|---|---|---|---|
| 3,943,911 | 3/1976 | Yu | 126/450 |
| 4,043,317 | 8/1977 | Scharfman | 126/422 |
| 4,058,109 | 11/1977 | Gramm | 126/422 |
| 4,219,009 | 8/1980 | Palmer | 126/419 X |
| 4,226,225 | 10/1980 | Niedermeyer | 126/419 X |
| 4,263,896 | 4/1981 | Zebuhr | 126/450 |
| 4,269,173 | 5/1981 | Krueger et al. | 126/450 |

*Primary Examiner*—Larry Jones
*Attorney, Agent, or Firm*—Haverstock, Garrett & Roberts

[57] ABSTRACT

A solar collector device for collecting and utilizing solar heat in conjunction with a solar heat distribution system comprising an elongated housing having a bottom wall, spaced opposed side walls, and first and second opposed end walls, a first glazing member mounted closing the top portion of the housing and adaptable to transmit solar radiation therethrough, a second glazing member disposed in the housing inwardly of the first glazing member forming an air space therebetween, at least one absorber plate member disposed between the second glazing member and the bottom wall of the housing having inlet and outlet manifolds and passageways therebetween through which a heat transfer medium can flow, system conduit members connected to the inlet and outlet manifolds, an opening in at least one of the end walls for accommodating the system conduit members, first and second closure members attachable respectively to the first and second opposed end walls forming an enclosed space at each respective end of the housing, an air flow opening formed in each of the first and second end walls in position to communicate the air space between the first and second glazing members with the spaces enclosed adjacent to the end walls by the first and second closure members, at least one orifice through each of the closure members communicating the spaces enclosed thereby to ambient atmosphere, and a control member mounted on each of the closure members in position normally closing the respective orifices therein, the control members responding to temperatures in the respective closure members in excess of a predetermined temperature to open the respective orifices to permit air flow therethrough.

30 Claims, 10 Drawing Figures

SOLAR COLLECTOR

The present invention relates generally to solar collector devices and, more particularly, to a double-glazed solar collector device having an end closure member attached respectively at each end portion of the collector housing for enclosing the inlet and outlet means of the absorber plate member including some of the plumbing associated therewith, means for communicating the space between the spaced glazing member with the spaces enclosed by the end closure members, and means to relieve excessive temperature conditions that may occur in the device.

There exists an ever increasing need and demand for efficient and economical solar heat collection and storage devices and particularly for such devices that are safe to use and conserve energy. Energy conservation, fuel economy in heat producing devices, and reduction in heating system installation costs are highly desirable goals and are the principal goals of the present device. A wide variety of solar collector devices have been designed and manufactured for use in collecting and utilizing solar heat in conjunction with a solar-heat distribution system for providing a source of energy to residential, commercial and/or industrial structures. Such known solar collector devices teach a wide variety of constructions adaptable for use in heating hot water supply systems, drying farm corps, space heating, and a variety of other applications requiring heat energy. Typical of such known solar collector devices are those described in U.S. Pat. Nos. 4,210,129; 4,198,956; 4,186,726; 4,186,724; 4,186,720; 4,062,352; and 3,995,804. The known devices for the most part are characterized by being relatively complicated, large in size, expensive, and many of the known systems have been difficult to repair and maintain. Other known constructions have required the assembly of a plurality of modular solar collector units arranged in interconnecting mating relationship with each other to form an array of modular units comprising an interlocked solar energy collector system. See for typical examples the constructions shown in U.S. Pat. Nos. 4,073,283; 3,996,918; and 3,943,911. Still other constructions utilize means for creating a turbulent flow of fluid and/or gas through the collector assembly for obtaining optimum heat transfer and some constructions utilized complicated venting systems including powered control systems and sensor apparatus to control and limit the temperature within the collector assembly. Such systems are generally quite expensive, and are also subject to failure because of power outages. See for typical examples the constructions shown in U.S. Pat. Nos. 4,219,009; 4,154,222; and 4,073,282. These features of the prior art devices have made them complex, expensive, difficult to install, inefficient, and commercially unacceptable.

Although the devices disclosed in the prior art have attempted to improve the durability, capability, and the efficiency of solar collector constructions, all such devices suffer from certain disadvantages and shortcomings. For example, one of the major problems associated with typical glazed solar collectors and, more particularly, with active double-glazed collectors, is controlling and limiting the maximum temperature buildup within the collector housing. Overheating typically occurs during periods of stagnation or high heat buildup which primarily arise due to power failures, pump failures, equipment breakdown, blockage or other failure in the cycling of the fluid transfer medium through the absorber plate members, and other malfunctioning of system components which can cause a no-flow condition. During such stagnation or high heat buildup periods, it is not uncommon for the temperature within the collector area to rise to unsafe conditions such as to above approximately 400° F., and if this overheating condition is allowed to continue, considerable damage to the system and system components may occur. Such overheating may cause rupturing of conduits and other internal flow passageways causing leakages in the system; deterioration and breakdown of interior bonds, welds, solders and other points of joinder; and, if excessive temperatures are allowed to persist for long periods of time, permanent distortions may occur in the absorber plate elements and related parts and may even cause melting of plastics and other non-metallic components sand possibly combustion of combustible materials. Although various known systems have been developed to protect solar collectors from overheating, many of these systems require complicated actuators such as wax thermal actuators and a variety of mechanical control cables and/or flexible force-transmitting linkages for controlling the opening and closing of panel venting apparatus to reduce temperature buildup within the collector assembly. Such systems are costly, require electrical power dependage, and have other disadvantages including being complicated and requiring periodic maintenance and lubrication.

Another problem encountered with known glazed solar collector devices is due to the collection and retention of moisture within the housing assembly. It is not uncommon for moisture to collect on or around the collector housing and to condense on the cooler surfaces of the housing as a dew which may thereafter penetrate into the housing assembly due to insufficient and/or improper weatherproofing where it can do considerable damage and can effect the collector's operating efficiency. This problem is compounded when standing water or other precipitation accumulates at or near locations between the collector components and/or subassemblies since such locations are prone to leakage. A further problem associated with the accumulation of moisture within glazed solar collector devices, especially double-glazed collectors, is fogging and accompanying deposit of particles on the glazing elements. Fogging effects the performance and operation of the solar collector device because it impairs the light transmission characteristics of the glazing elements and reduces the overall efficiency. Proper drainage of the excess moisture buildup within the collector housing is therefore important not only from the standpoint of substantially reducing corrosion, rust, and other metal deterioration of the collector components but also because it substantially reduces fogging. Still other problems associated with most known solar collectors include excessive heat loss and inadequate protection and insulation of the associated plumbing thereby increasing the possibility of damage due to freezing and further contributing to inefficient operation. No known solar collector device has been able to effectively solve these problems and disadvantages and none teaches the construction and operation of a relatively inexpensive, efficient solar collector device which includes means to limit the maximum temperature that can exist within the collector housing; provide for the adequate removal of excess moisture; and provide protection and insulation for much of the plumbing associated with the panel. For these and other reasons, the known glazed solar collector constructions have not been entirely satisfactory and have enjoyed limited usefulness.

The present solar collector device overcomes many of the limitations and shortcommings associated with known solar collector devices and teaches the construction and operation of a relatively simple and inexpensive solar collector panel. The present device includes a pair of spaced apart glazing members disposed within a generally rectangular housing structure forming an air channel therebetween and at least one absorber plate member disposed below the glazing members having means associated therewith for cycling a fluid transfer medium therethrough. An end closure member is hingedly connected to each end portion of the collector housing forming respective chambers therewith for enclosing the inlet and outlet manifolds of the absorber plate member and any system plumbing associated therewith. Each of the end closure members is movable between a closed position adjacent to the respective end walls of the housing structure and an open position angularly related thereto exposing the end walls for access thereto. When in their fully closed position, such closure members provide protection and insulation to the inlet and outlet means of the absorber plate member and all system plumbing associated therewith which would normally be exposed to the elements. In addition, the end closure members also reduce heat loss to the atmosphere by providing additional insulating spaces around the end walls of the collector housing. At least one opening is located on each of the end walls of the collector housing for communicating the air channel between the two glazing members with the enclosed chambers formed by the end closure members. These openings allow the heat accumulated between the glazing members to be present in the chambers formed by the end closure members thereby providing additional heat around the associated plumbing contained therein. This is especially important during the colder months when system efficiency is most important and when the possibility of damage by freezing is most likely to occur. In automatic drain down systems, the end closure members also provide an ideal place for the freeze sensor(s) to be located.

The present device also includes temperature responsive venting means on each of the end closure members respectively for limiting the maximum temperature within the housing structure. The venting means operate without electrical power dependage and include bi-metallic members which extend across and normally close openings formed in the walls of the end closure members. Each bi-metallic member is selectively adjustable to open and enable colder ambient air to enter and circulate through the collector device between the two glazing members whenever the temperature within the housing structure exceeds a predetermined temperature. This introduction of atmospheric air into the air channel between the glazing members also removes any excess moisture which may accumulate between the glazing members and substantially reduces fogging.

In addition, alternative embodiments of the present device may include conduit means disposed within the collector housing for returning the fluid transfer medium from the outlet portion of the absorber plate member to the solar heat distribution system; heat absorbing means located on one or both of the end closure members for independently heating the enclosed spaces formed by said members; and access means whereby system components within the collector housing assembly can be easily accessed for maintenance and service.

A principal object of the present invention is to provide an efficient solar panel.

Another object is to provide a solar panel that is structurally and operationally relatively simple and inexpensive.

Another object is to include means on a solar panel to prevent overheating.

Another object is to reduce the possibility of damage to a solar panel caused by overheating.

Another object is to reduce the possibility of damage to a solar panel due to a power failure or other interruption in the system to which the panel is connected.

Another object is to provide better and more efficient protection and insulation for the system connections to the solar panel and to provide more efficient, better insulation for the solar panel itself.

Another object is to teach the construction of a solar collector device which includes means for removal of moisture which may accumulate therein including between the spaced glazing members, this removal being accomplished without using weep holes or vents that are always open causing continuous heat loss.

Another object is to provide a solar collector device having a pair of end closure members attached respectively to each end portion of the collector housing for enclosing the inlet and outlet means of the absorber plate member and the associated plumbing therefor.

Another object is to provide a solar collector device having means associated therewith for substantially reducing the possibility for fogging of the glazing members.

Another object is to teach the construction of a solar collector device which includes means to enable airflow through an airspace formed between spaced glazing members therein whenever the temperature within the collector housing exceeds a predetermined temperature.

Another object is to provide a solor collector device which is relatively simple structurally and is easy to install and maintain.

Another object is to provide a solar collector device which can be easily accessed for maintenance and service.

Another object is to provide a solar collector device which produces minimum heat loss to atmosphere.

Another object is to provide a solar collector device which reduces the possibility of damage to the system components due to freezing.

Another object is to provide a relatively simple solar collector device which can be economically produced for both commercial and non-commercial use.

Another object is to provide a solar collector device that is relatively inexpensive, lightweight, durable and requires relatively little maintenance.

These and other objects and advantages of the present invention will become apparent to those skilled in the art after considering the following detailed specification which discloses several different embodiments of the subject device in conjunction with the accompanying drawings, wherein:

Figure 1:
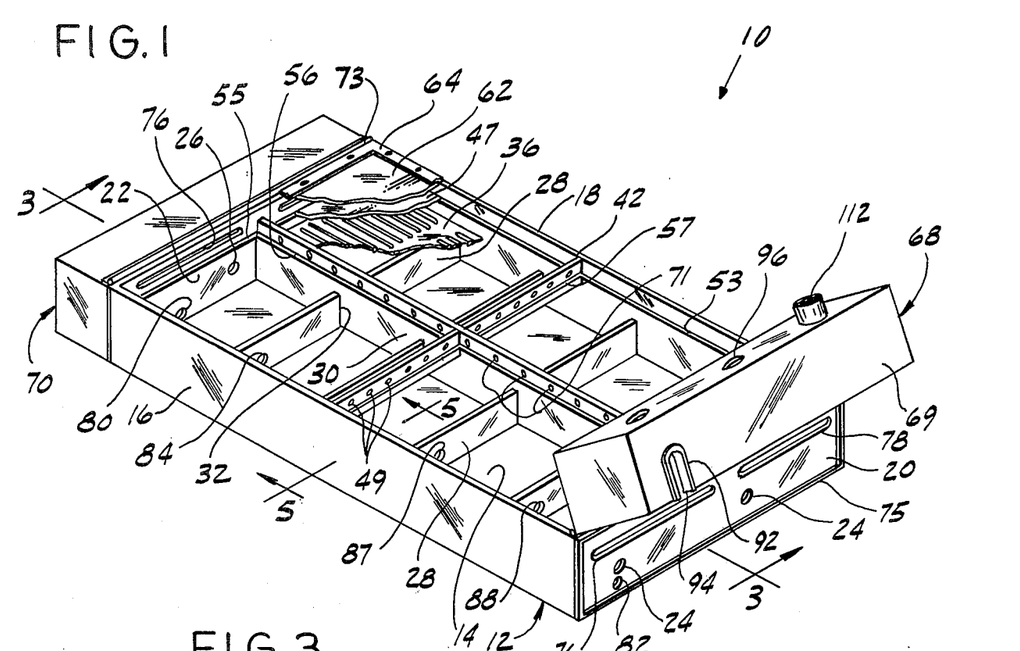
FIG. 1 is a perspective view showing a solar collector device constructed according to the teachings of the present invention.

Referring to the drawings more particularly by reference numbers wherein like numerals refer to like parts, number 10 in FIG. 1 illustrates a solar collector device constructed according to the teachings of the present invention. The solar collector 10 comprises an elongated retangular housing 12 adapted for mounting on a roof or wall of a building in a direction to receive maximum solar radiation. The housing has a bottom wall member 14, spaced opposed side wall members 16 and 18, and spaced opposed end wall members 20 and 22. The end wall 20 has at least one inlet port 24 for locating conduit means to be described later for carrying a fluid transfer medium which circulates through the collector housing 12. The opposite end wall 22 includes at least one corresponding outlet port 26 for locating conduit means used for returning the fluid medium to a solar heat distribution system. The rectangular housing 12 is open at the top and includes a plurality of crosswise extending support members 28 positioned in spaced relationship and parallel to the end walls 20 and 22. The members 28 are not as wide as the housing is deep. A longitudinal support member 30 extends the length of the housing structure 12 and is notched as at 32 (FIGS. 1 and 2) to receive and support the members 28. The member 30 is somewhat wider depthwise than the cross members 28.

Figure 2:
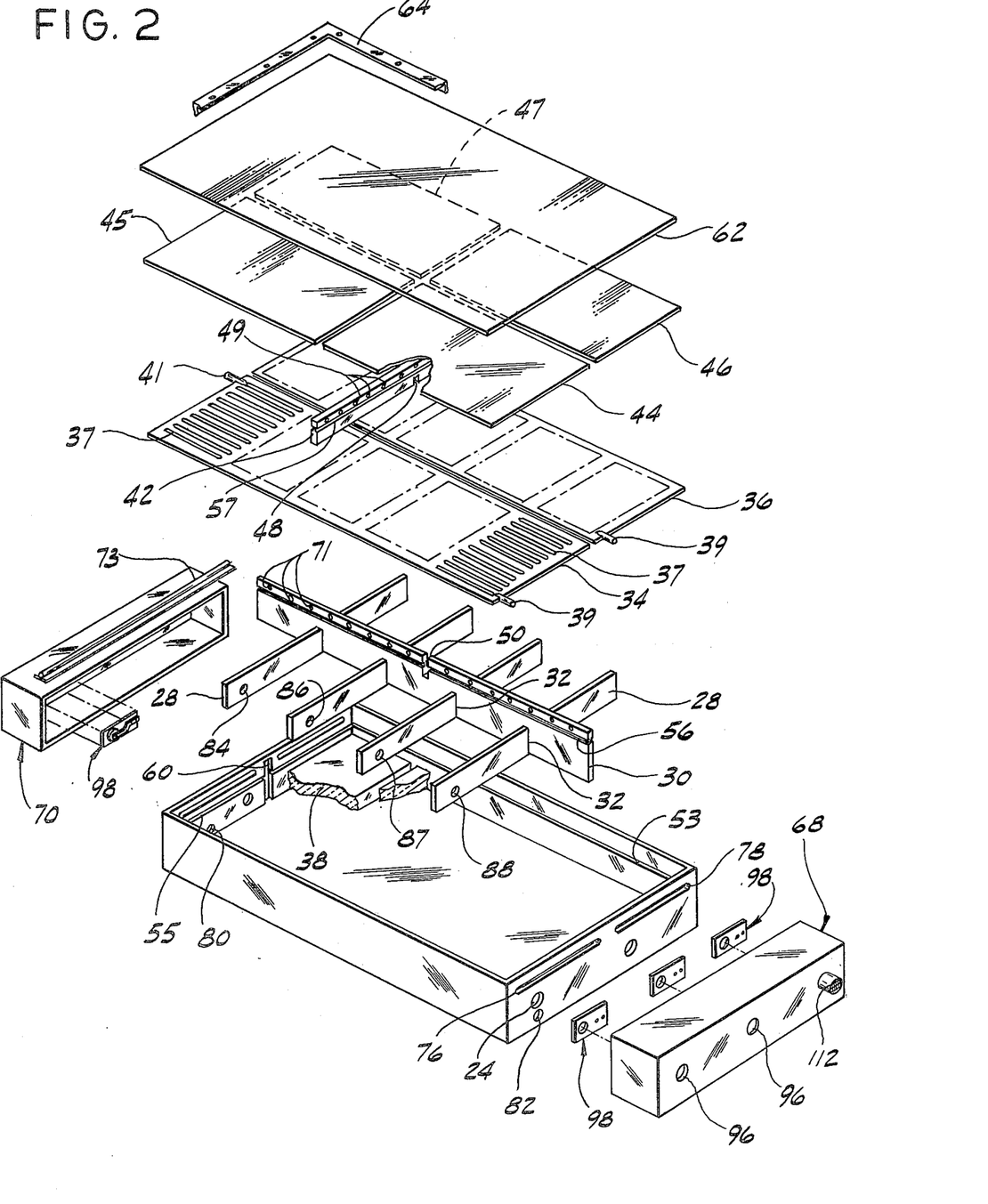
FIG. 2 is an exploded perspective view of the subject solar collector.
Figure 3:
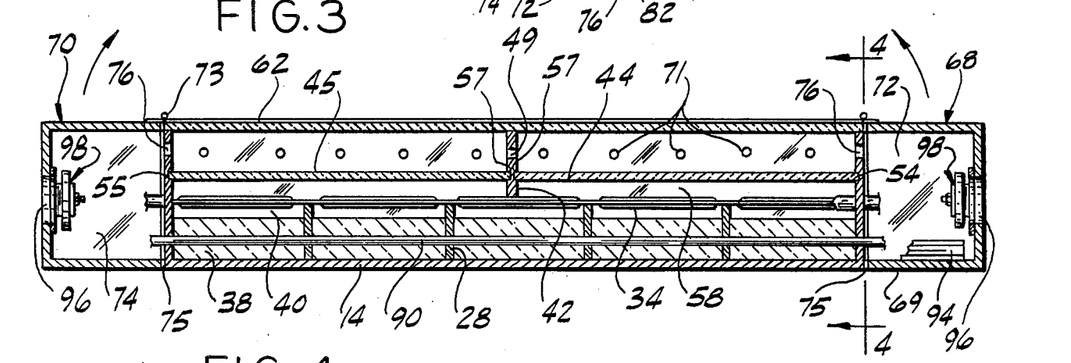
FIG. 3 is a cross-sectional view taken along line 3—3 of FIG. 1 but showing both end closure members of the device in their closed conditions.
Figure 4:
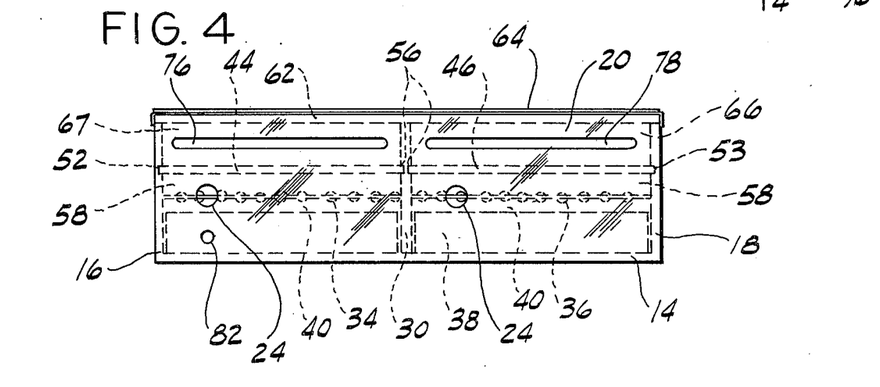
FIG. 4 is a cross-sectional view taken along line 4—4 of FIG. 3.
Figure 5:
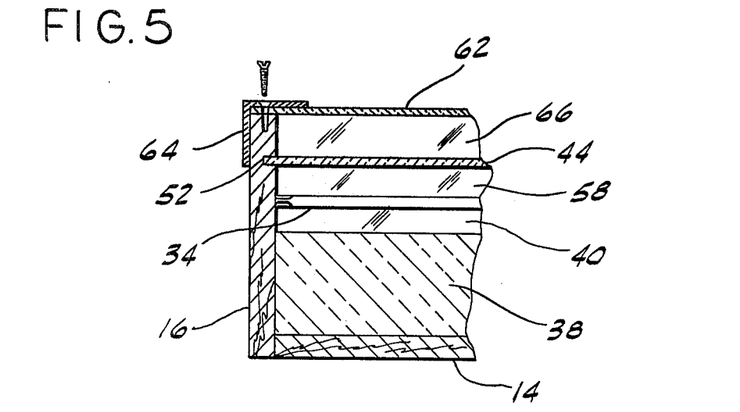
FIG. 5 is a partial cross-sectional view taken along line 5—5 of FIG. 1.

In the preferred embodiment, a pair of conventional absorber plate members 34 and 36 (FIG. 2) which are constructed to pass a heat absorbing fluid medium therethrough are mounted in the housing 12 on top of the crosswise support members 28 on respective opposite sides of the center support member 30. The absorber plates 34 and 36 therefore overlay substantially the full interior area of the housing and are exposed on one side to the sun's rays. Each abosrber plate 34 and 36 has a plurality of flow passageways 37 formed therein, and each has an inlet and an outlet manifold 39 and 41 located at the respective opposite ends thereof, which manifolds are positioned to extend through the corresponding inlet and outlet ports 24 and 26 (FIGS. 1 and 4). These inlet and outlet manifolds 39 and 41 are used to connect the absorber plates 34 and 36 into a solar heat distribution system which is a system through which a fluid heat transfer medium such as water passes as it carries the heat absorbed by the members 34 and 36 to some means where the heat is used. Solar energy is absorbed over substantially the entire suface area of the absorber members 34 and 36, and the cycling of a fluid medium therethrough transfers the absorbed heat energy to the fluid medium. Typical of absorber plates for use with the present device are copper absorber plates such as those manufactured by Olin Brass which include sheets of a copper alloy metallurgically bonded together with selected areas expanded to form numerous closely spaced flow passageways for the fluid medium. Although the embodiment of the present device shown has a pair of absorber plate members, it is anticipated that the present device can be easily and conveniently adapted to utilized any number of absorber plates. It is also expected that any number of solar panels of the present type can be used in concert as required.

a layer of an insulation material 38 such as a layer of polyurethane foam for reducing heat loss through the bottom wall 14 and improving the overall efficiency of the collector 10 may be installed between and around the support members 28 and 30 below the absorber plate members such that airspaces 40 are formed therebetween as shown in FIGS. 3 and 5. The airspaces 40 provide additional insulation between the absorber plates and the insulation material 38. At least one crosswise support member 42 is positioned extending above the abosrber plates (FIGS. 1 and 2) for holding and supporting four lower glazing members 44, 45, 46 and 47 which are disposed between the abosrber plates and the open top of the housing structure. The lower glazing members 44–47 are made of glass or any other similar heat resistant material having relatively good light transmission characteristics and yet able to withstand the high temperatures that may develop in the housing. The crosswise glazing support member 42 may be notched as at 48 so as to cooperatively engage a corresponding notch 50 located in the upper portion of the center support member 30 as shown in FIG. 2. The use of interlocking notches 48 and 50 adds to the stability and rigidity of the housing 12, although any suitable means for supporting the glazing members 44–47 can be used.

The lower glazing members 44–47 are securely held within the housing 12 by the use of grooves 52, 53, 54, 55, 56 and 57 in the wall members 16, 18, 20, 22 and in opposite sides of both center member 30 and crosswise support member 42 (FIGS. 1–5). The respective grooves 52–57 are correspondingly aligned and of sufficient depth such that lower glazing members 44–47 may be slideably positioned within the corresponding grooves and securely held therein in substantially parallel spaced relationship from the absorber plate members 34 and 36 forming enclosed airspaces or channels 58 therebetween (FIGS. 4 and 5). In addition, end wall members 20 and 22 may likewise include additional notches 60 (FIG. 2) for receiving and holding the center support member 30. Any suitable heat resistant adhesive or other mechanical means may likewise be utilized to secure the lower glazing members 44–47 within the housing structure. Additionally, although the embodiment of the present invention as shown discloses the use of several lower glazing members positioned to overlay substantially the full area of the absorber plate members, it is anticipated that the housing 12 may be easily and conveniently adapted to accommodate the use of any number of such lower glazing members as required including the possibility of using a single such member.

An upper glazing member 62 of light conductive material is mounted in the housing 12 and is spaced above the lower glazing members 44–47 sealably closing the top of the housing structure. This can be done by the use of any suitable means such as the molding 64 shown in FIGS. 1, 2 and 5. The upper glazing member 62 is substantially parallel to the bottom wall 14 and is preferably additionally supported by crosswise support member 42 as shown in FIG. 4. Glazing member 62 is preferably constructed from a combination of materials capable of withstanding the elements as well as relatively high temperatures. Materials such as fiberglass and polyester resin plastic in combination are suitable for this purpose. Typical of such a fiberglass glazing member is a glazing panel manufactured by the Kalwall Company. Unlike thermoplastic glazings, the Kalwall panels have the high efficiency transmission characteristics of glass yet are lightweight, shatterproof, resist heat degradation, and require minimum maintenance over long periods of use. Although an upper exposed glazing member similar to the Kalwall panel is preferred, any known glazing material may be utilized so long as such material is light transmitting, durable and is able to withstand moderate impact and normal usage without damage.

Support member 42 includes a plurality of spaced openings 49 (FIGS. 1–3) extending therethrough on each opposite side of the central support member 30 for interconnecting the adjacent air spaces between the glazing members on each opposite side of the member 42 thereby forming a pair of narrow uninterrupted airspace cavities or channels 66 and 67. The uninterrupted airspace cavities 66 and 67 are formed by and between the lower and upper glazing members 44–47 and 62 and extend through the openings 49 from end to end of the housing 12 on each opposite side of the center support member 30 as shown in FIGS. 3 and 4, and these airspace cavities are important to the present invention as will be hereinafter explained and serve as an insulating medium therebetween. The cavities 66 and 67 may also be interconnected by means of a plurality of spaced openings 71 which extend through the center support member 30 and communicate the spaces therebetween. Although the openings 71 are optional, they are generally preferred because they minimize the possibility of a temperature differential existing between airspaces 66 and 67 thereby reducing the possibility of a damaging temperature differential occuring in the device.

Although various materials can be used in the construction of the present device, it is preferred that the housing 12 be of a suitable durable heat insulating material such as of certain plastic materials or of an exterior-grade wood that is able to withstand abuse and exposure to the elements. It is also generally desirable to leak-proof the housing 12 by employing weatherproof caulking or other similar sealants between the respective joints, the glazing members and the housing. This minimizes heat loss, reduces the potential for moisture accumulation within the housing 12 and increases the overall efficiency. It is also recognized that the housing 12 as well as other components can be fashioned into a variety of sizes and configurations without departing from the teachings and practice of the present invention.

Similar end cover or closure members 68 and 70 are hingedly attached to the upper edge of the end wall members 20 and 22 respectively, such as by pivot means 73, and are movable between a closed position adjacent to the respective end walls and open positions angularly related thereto exposing the respective end walls for access. In their closed positions the closure members 68 and 70 enclose respective spaces 72 and 74 at each opposite end of the housing 12. The spaces 72 and 74 enclose the inlet and outlet manifolds and other system connections to the absorber plates and also serve other important functions as will be hereinafter explained. The end closure members 68 and 70 are important to the performance and efficiency of the present device because they reduce heat loss to the atmosphere by providing insulating spaces between the end wall members 20 and 22 and atmosphere and they provide additional protection to any plumbing enclosed therein from damage by freezing. It is also generally desirable to employ a gasket such as gasket member 75 (FIGS. 1 and 3) which extends around the perimeter of each respective end wall member 20 and 22 (or around the adjacent edges of the respective end closure members 68 and 70) such that, when the end closure members are in their closed positions, they each engage their respective gasket member 75 thereby forming a weathertight seal therebetween. This helps to further reduce heat loss and prevents unwanted ingress of rain, dirt or other debris. Although the closure members 68 and 70 are shown hingedly attached to the ends of the collector housing, it is recognized that they can be attached to the housing 12 by any suitable means that will permit access to the spaces therein and to the housing end walls.

Important to the operation of the present construction are pairs of similar elongated slots such as slots 76 and 78 formed in each respective end wall member 20 and 22 respectively on opposite sides of the center support member 30 as shown in FIGS. 1, 2 and 4. The slots 76 and 78 are located between where the lower and upper glazing members 44–47 and 62 are attached to the end walls and communicate the airspaces 66 and 67 with the spaces 72 and 74 enclosed by the closure members 68 and 70. This allows the air spaces between the glazing members to be communicated to the spaces 72 and 74 thereby providing internal collector heat to be available around the manifolds and other plumbing contained therein. This is especially important in certain climates during the winter months when system efficiency is most important and when the possibility for freezing and rupturing of the plumbing is greatest.

The present collector device 10 may include other openings 80 and 82 located respectively through end wall members 22 and 20 and a plurality of corresponding aligned openings 84, 86, 87 and 88 located respectively through the crosswise support members 28 (FIGS. 1 and 2). The openings 80–88 are positioned in alignment with each other to support return plumbing or conduit means 90 in the absorber plates so that the return conduit can be retained within the structure when the closure members 68 and 70 are in their closed positions which is the operational condition of the device. The return plumbing 90 is preferably routed through and encased by the insulation material 38 (FIG. 3) to provide additional protection therefor. Enclosing as much of the plumbing as possible is important to the present collector device because it minimizes the possibility of damage by freezing. It is generally also desirable to wrap or enclose the plumbing with a flexible pipe wrapping to further protect the plumbing from damage by freezing and such wrapping provides a vapor barrier that effectively prevents any moisture which might occur on the plumbing due to pipe sweating from accumulating within the housing and vaporizing and settling therein, especially settling on the glazing members where it can adversely effect the operating efficiency of the collector. Since the inlet and return conduits are normally located in close proximity, a U-shaped opening 92 as shown in FIG. 1 may be provided on the bottom wall 69 of one of the closure members such as end closure member 68 to facilitate attachment thereof to other plumbing in the system and to enable opening the closure member 68 without disconnecting the plumbing. The opening 92 may include a protective liner 94 or other member to minimize heat loss therethrough, to prevent moisture and other debris from entering therethrough, and to prevent damage to the plumbing and to the wrapping thereon.

Normally closed temperature responsive valve means or vents designed to open when the internal temperature rises to some predetermined temperature, such as 160° C., are mounted on at least one and preferably on both of the closure members 68 and 70. The vents are provided to control and limit the maximum temperature that can occur within the collector housing 12. These vents include openings 96 formed in the respective end closure members 68 and 70 which are normally closed by movable valves such as bi-metallic valves 98 which are attached at one end portion thereof to the inside wall of the respective closure members 68 and 70. The opposite or free ends of the bi-metallic valves carry the movable valve members such as member 108 (FIGS. 6 and 7) which are large enough to close the respective openings 97 in their closed positions. This is the case whenever the temperature within the collector housing 12 including the temperature within the respective end closure members 68 and 70 is less than some predetermined maximum temperature.

Figure 6:
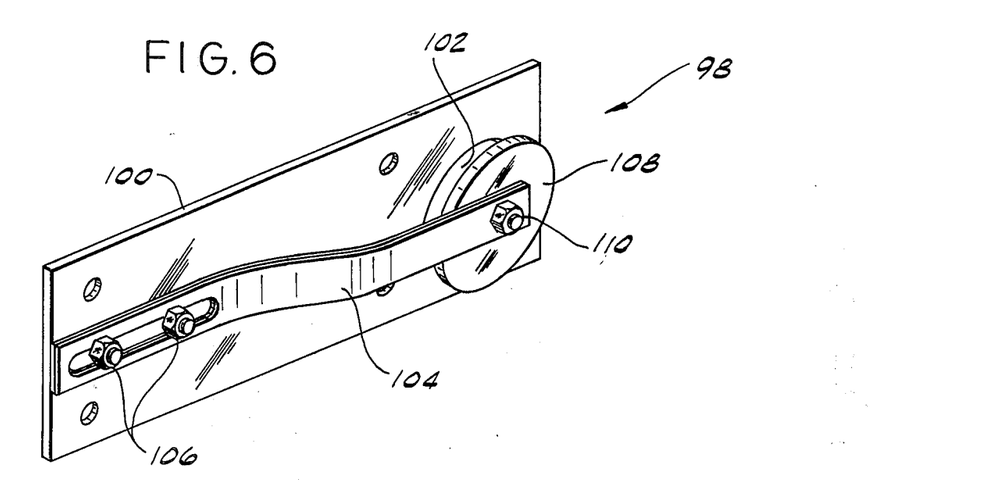
FIG. 6 is a perspective view of a temperature responsive valve assembly for use on the subject device.
Figure 7:
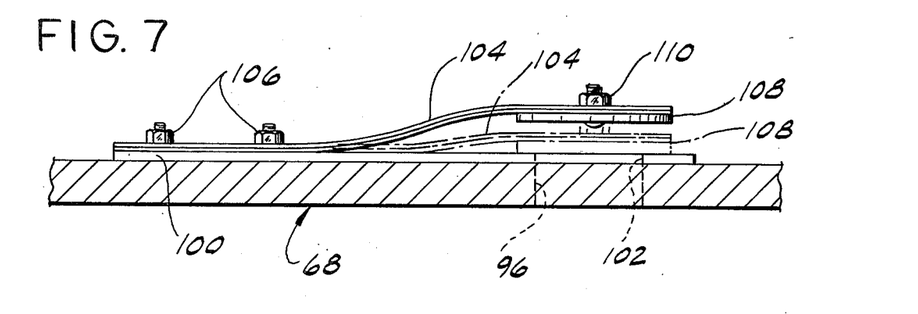
FIG. 7 is a side elevational view of the valve assembly of FIG. 6 showing the end closure member in part, the valve assembly being shown in solid outline in its open position and in dotted outline in its closed position.

FIGS. 6 and 7 show more of the details of a typical bi-metallic valve member 98 which may be utilized in the practice of the present invention. The bi-metal valve 98 is shown including a base plate 100 having a vent opening 102 therethrough adjacent one end. The plate 100 is mounted on the inside end wall of one of the closure members 68 and 70 so that it is exposed to the environment within the respective spaces 72 and 74, and the vent opening 102 is positioned in registration with the respective opening 96 in the closure member (FIG. 7). An elongated bi-metallic strip or flap 104 has one of its ends fixedly mounted to the base plate 100 by threaded means such as threaded members 106. The movable valve 108 is attached adjacent to the opposite end of the bi-metal strip 104 in position to normally close the openings 96 and 102. The valve member 108 may be attached to the bi-metal strip 104 by any suitable means such as by threaded member 110. An aluminum base plate and silicone gasketing are generally preferred because they are able to withstand high temperatures and the frequent cycling of the bi-metallic strip 104 without breakdown. The bi-metallic strip or flap 104 is heat sensitive and can be adjusted to deflect sufficiently to open the associated valve anywhere within a desired range of temperatures. This can be done by proper selection of the materials utilized in the strips such as strip 104 and also by loosening the respective threaded members such as members 106 and sliding the bi-metal strip fore or aft to either lengthen or shorten the strip. The overall effective length of the bi-metallic strip 104 from where it is attached to its free end as well as the characteristics of the materials from which the strip is made determines the temperature at which the respective vents will open. It should be noted that the bi-metal valve means are mounted inside the device and are exposed to the internal temperature therewithin. In addition, base plate 100 is optional and the bi-metallic strip of flap 104 may have its one end directly mounted to the inside end wall of each respective closure member.

As the temperature within the collector assembly rises, the bi-metallic strip 104 will bend or flex and this bending action will move the valve member 108 to its open position relative to this opening 96 as shown in solid outline form in FIG. 7. This process takes place gradually at first and increases substantially above some desired temperature at which there is sufficient opening to enable substantial outside air to enter and circulate through the collector device, and especially in the space between the upper and lower glazing members, to retard and prevent damaging heat buildup and to allow the collector housing to cool to acceptable temperature levels. This effectively reduces and limits the maximum possible temperature that can occur between the glazing members 44-47 and 62 while, at the same time, it allows the heat absorbing area below the lower glazing member, which is maintained air tight, to collect heat. When the collector housing 12 including the spaces 72 and 74 enclosed by the respective end closure members 68 and 70 and the spaces 66 and 67 between the glazing members 44-47 and 62 have cooled sufficiently to cause the temperature therewithin to decrease below the predetermined maximum temperature permitted therein, the movable valve members 108 will gradually return to their fully closed positions as shown in dotted outline form in FIG. 7 thereby reclosing the openings 96 and allowing the collector device to return to its normal heating mode. Any desired number of the temperature responsive vents may be mounted on each end closure member 68 and 70, the number at each end depending on the particular size and shape of the collector housing, the type of system components utilized therein, the size of the vents used, and the operating temperatures to be maintained therein. The vents should be arranged to provide sufficient flow of air across substantially the entire width of the collector housing 12 between the glazing members so that cooling occurs throughout the entire collector area. A cap or shielding member such as member 112 may be placed over each of the openings 96 as shown in FIG. 1 to prevent the unwanted ingress of rain, dirt, or other debris. It has been found to be desirable to adjust the temperature responsive valve members 98 to open to provide reasonable air flow therethrough at a temperature between about 100° F. and about 180° F. This temperature range affords a safe operating temperature for most system components and provides the user some latitude in the selection of a safe maximum internal temperature.

The temperature responsive vents in conjunction with the housing end slots 76 and 78 provide uninterrupted air flow communication longitudinally through the device between the glazing members 44-47 and 62 when the internal temperature exceeds the selected maximum operating temperature such as occur during high heat buildup periods as during a power failure when the water or other fluid medium is not being cycled through the absorber plate members 34 and 36 to carry away the heat. Under such a condition the heat buildup will be limited and the system will not be damaged. During such stagnation periods, the internal temperature, if not limited by means such as described, may rise considerably, even to 400° F. and above, and if this were permitted the excessive temperature would damage and possibly ruin the device. The present method for controlling and limiting the maximum temperature buildup within the collector housing provides a failsafe feature which requires no electrical dependence and relatively little, if any, maintenance. It should also be observed that the method described for introducing outside air into the space between the glazing members 44–47 and 62 by the automatic opening of the vents acts as a heat sink with respect to the heat absorbing area below the lower glazing members to relieve any temperature buildup therein and likewise avoid component damage. Still further, the air flow provided between the lower and upper glazing members 44–47 and 62 minimizes the possibility for fogging the glazing members which often occurs in double glazed collectors, as previously explained, and which can adversely affect the operating efficiency of the collector. It also carries away moisture which may be present between the glazing members.

Figure 8:
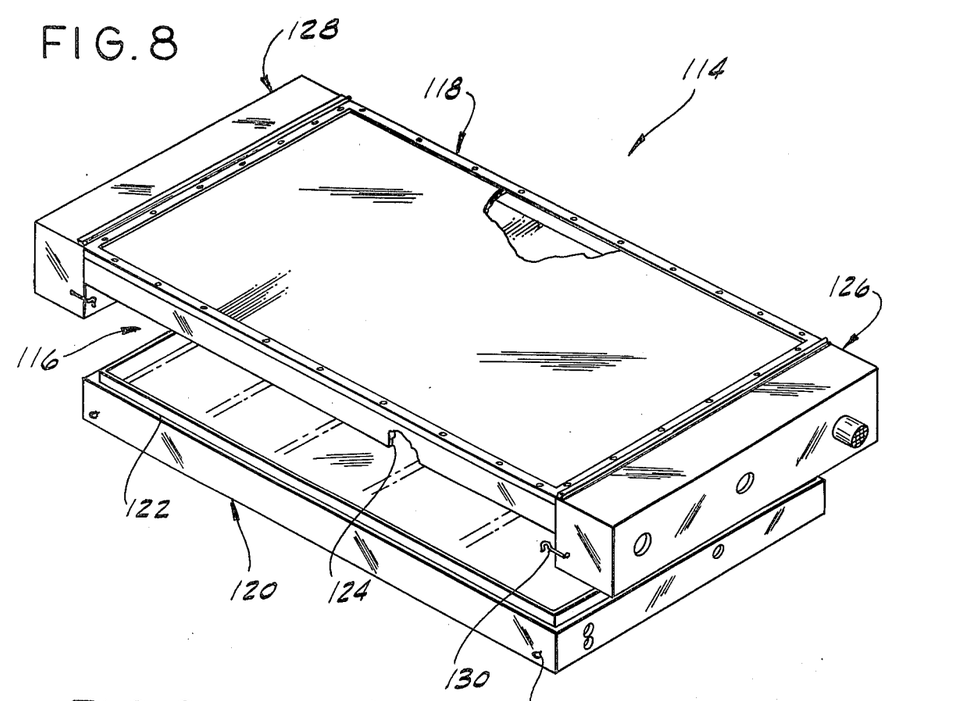
FIG. 8 is a perspective view similar to FIG. 1 but showing an alternative embodiment of the collector housing assembly.

FIG. 8 discloses another embodiment 114 of the present solar collector device wherein the collector housing 116 is formed as a two piece construction having an upper housing portion 118 and a lower housing portion 120. The collector housing 116 is very similar in construction and operation to the collector housing 12 disclosed in FIGS. 1–5 but differs therefrom mainly because it is divided lengthwise between the portion in which the absorber plate members 34 and 36 are located and the portion in which the glazing members 44–47 and 62 are located. The housing portion 118 is cooperatively engageable with housing portion 120 by any suitable complementary attachment means for fastening and joining said portions in interconnecting mating relationship, preferably using a rabbet joint connection wherein edge rabbet 122 on the housing portion 120 cooperates with tenon 124 on the housing portion 118. In addition, it is preferred that a suitable insulation material or other sealant be employed between members 118 and 120 for minimizing heat loss through the housing and minimizing the possible accumulation of moisture therein. The embodiment of FIG. 8 may simplify the installation and serviceability of the device by providing convenient access means into the collector housing. Although any suitable means for attaching housing portions 118 and 120 may be utilized, such means should enable convenient removal of the upper housing portion 118 preferably without disturbing the lower portion 120.

In the embodiment 114, end closure members 126 and 128, similar to the construction and operation of the end closure members 68 and 70 shown in FIGS. 1–3, are hingedly attached at each respective end of the housing and are movable between open and closed positions in a manner already described. Any suitable securing means such as a hook member 130 and an eyelet 132 may be utilized to hold and secure the end closure member in their closed positions. Similar means may also be utilized to hold and secure the housing portions 118 and 120 in their locked together condition. In other respects, the construction and operation of the embodiment 114 is substantially the same as the solar collection device 10.

Figures 9, 10:
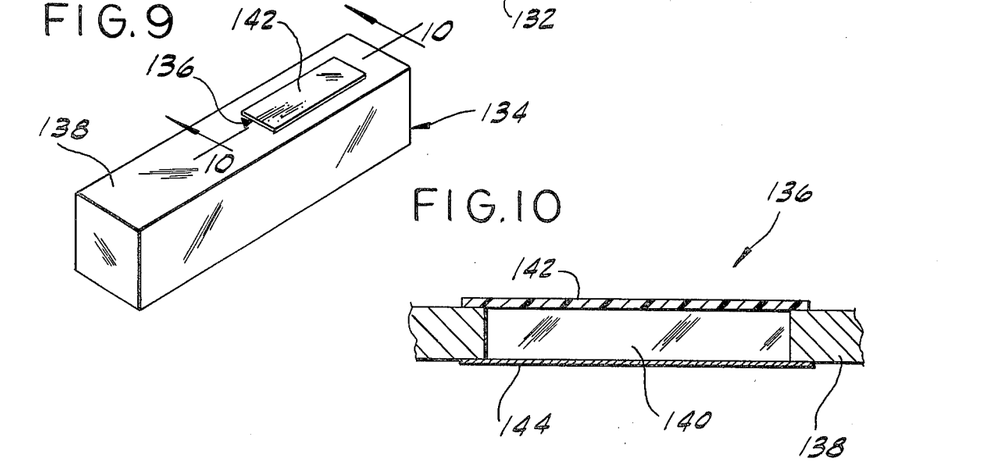
FIG. 9 is a perspective view of an alternative embodiment of an end closure member having heat absorbing means associated therewith for independently heating the enclosed space formed within said member.
FIG. 10 is a fragmentary cross-sectional view taken along ling 10—10 of FIG. 9.

FIGS. 9 and 10 disclose a modified embodiment of the end closure members wherein they include heat absorbing means 136 associated with the upper wall 138 thereof for separately and independently heating the spaces enclosed thereby to better and more uniformly maintain the temperature throughout the collector. The heat absorbing means 136 may include an opening 140 extending through the wall member 138 having a glazing member 142, similar to glazing member 62, sealably mounted closing the opening 140 as shown, for example, in FIG. 10. A heat absorbing member 144 is disposed on the opposite side of the wall 138 from the glazing member 142 and likewise is sealably attached to the wall 138 across the opening 140. Any suitable heat absorbing element capable of absorbing substantial amounts of solar radiation may be utilized for the member 144 including, for example, a thin aluminum sheet having its upper surface darkened to increase its heat absorbing capabilities. The solar radiation transmitted by glazing member 142 to the absorber member 144 is used to heat the spaces enclosed by each respective end closure 134. The use of the heat absorbing means 136 in one or both of the end closure members increases the overall operating efficiency and improves the heat transfer characteristics for providing additional heat around the associated plumbing contained therein. This not only increases efficiency but also reduces the possibility for freeze damage in cold weather.

As hereinbefore discussed, the present invention teaches the construction and operation of a relatively inexpensive, efficient solar collector device ideally suited for water and space heating applications, which device includes means to limit the maximum possible temperature that can be present within the collector housing to alleviate the potentially damaging problems associated with high temperature stagnation. In discussing the various embodiments of the present invention, it is to be understood that any number of similar solar collector devices may advantageously be arranged or connected in series and/or parallel combinations as required. This enables the employment of an arrangement of collectors to suit a particular need and increases the usefulness of the present device.

Thus there has been shown and described a novel solar collector device for use in collecting and utilizing solar heat in conjunction with a solar heat distribution system, which device fulfills all of the objects and advantages sought therefor. Many changes, modifications, variations, and other uses and applications of the present construction will, however, become apparent to those skilled in the art after considering this specification and the accompanying drawings, and all such changes, modifications, variations, and other uses and applications which do not depart from the spirit and scope of the invention are deemed to be covered by the invention which is limited only by the claims which follow.

What is claimed is:

1. A solar collector device comprising an elongated housing structure having a bottom wall, opposed side walls, and first and second end walls, a first glazing member mounted closing the top portion of said housing structure, a second glazing member disposed inwardly of the first glazing member forming an air space therebetween, an absorber member disposed in the housing structure between the second glazing member and the bottom wall, first and second end closure members attached respectively to said first and second end walls, each of said end closure members including means forming an enclosed space adjacent the respective end wall, means associated with the respective end walls communicating the air space between the glazing members with the enclosed spaces formed by the end closure members, and means on each of said end closure members for controllably communicating the enclosed spaces formed by the end closure members to atmosphere to limit the maximum temperature that can occur in the space between the glazing members, said first and second end closure members being movable between a first position wherein said end closure members lie adjacent to the respective end walls and a second position providing access to the respective end walls.

2. The solar collector defined in claim 1 wherein the first glazing member is constructed of light conducting material and is substantially parallel to the bottom wall.

3. The solar collector defined in claim 1 wherein the second glazing member is constructed of heat resistent material that has light conducting characteristics.

4. The solar collector defined in claim 1 wherein the absorber member has flow channel means formed therein for containing a heat transfer medium, and inlet and outlet means on said absorber member communicating with the flow channel means.

5. The solar collector defined in claim 4 wherein at least one of said first and second end walls has an opening therethrough registerable with the inlet and outlet means on the absorber member.

6. The solar collector defined in claim 4 further including means to make connections to the inlet and outlet means of the absorber member, said means being disposed at least in part within one of said end closure members.

7. The solar collector defined in claim 1 wherein the absorber member overlays substantially the entire area of the bottom wall.

8. The solar collector defined in claim 1 wherein said first and second end closure members are hingedly attached to the housing structure.

9. The solar collector defined in claim 1 wherein said means communicating the air space formed between said first and second glazing members with the enclosed spaces formed by said first and second end closure members includes at least one elongated slot through each of the first and second end walls.

10. The solar collector defined in claim 1 wherein said means on each of said end closure members includes at least one opening therethrough and respective valve means normally closing each of said openings, said valve means including a temperature sensitive member movable between a first position wherein the valve means close the respective opening in the closure member when the temperature in the closure member is less than a predetermined temperature and a second position providing communication through the respective opening when the temperature in the closure member exceeds said predetermined temperature.

11. The solar collector defined in claim 10 wherein said valve means include respective bi-metal members mounted in the end closure members, and valve members attached to said bi-metal members in position to cooperate with the respective openings therein.

12. The solar collector defined in claim 11 including means to selectively adjust the positions of the bi-metal members on the respective closure members so as to adjust the predetermined temperature at which the valve means move from their closed to open positions.

13. The solar collector defined in claim 1 wherein said housing structure is formed by two portions including an upper portion and a lower portion, said housing portions having cooperatively engageable means to form an airtight connection therebetween and fastener means for holding the housing portions together.

14. A solar collector comprising a box-like structure having a bottom wall, opposed side walls, and spaced end walls forming a space therewithin, a first light conducting member attached to and extending across the top of said box-like structure, a second light conducting member disposed within said box-like structure in substantially parallel spaced relation from the first light conducting member forming a chamber therebetween, a heat absorber member positioned within said box-like structure between said second light conducting member and the bottom wall, said absorber member having an inlet, an outlet and passage means therebetween, an opening through at least one of the end walls for accommodating connections to said inlet and outlet, an end closure member attached to each end of the box-like structure, said end closure members forming enclosed spaces with the respective end walls, an opening in each of the end walls communicating the chamber between said first and second light conducting members with the spaces formed by the end closure members, and other means on each of said end closure members for controlling communication between the spaces formed therein with the ambient outside air, said other means including at least one orifice through each of the end closure members and respective valve means adjacent to each of said orifices to control communication therethrough, said end closure members being hingedly attached to the box-like structure adjacent to the respective end walls for movement between closed positions adjacent to the respective end walls and open positions angularly related thereto providing access to the respective end walls.

15. The solar collector defined in claim 14 wherein the respective valve means include elongated bi-metal members having a first end fixedly attached to the respective end closure member and a free opposite end for cooperating with the respective orifice.

16. The solar collector defined in claim 15 wherein said respective bi-metal members are constructed to substantially close the respective orifices when the temperature inside the respective end closure members is less than about 140° F.

17. The solar collector defined in claim 14 wherein said absorber member overlays substantially the full bottom wall of said box-like structure.

18. The solar collector defined in claim 14 including conduit means and means connecting the conduit means to the inlet and outlet of the heat absorber member, at least a portion of said connecting means being located within the space formed by one of said end closure members.

19. The solar collector defined in claim 18 wherein said connecting means are wrapped in insulation material.

20. The solar collector defined in claim 14 wherein said box-like structure is constructed of mating upper and lower portions, said upper portion containing said first and second light conductive members and said lower portion containing the heat absorber member.

21. The solar collector defined in claims 1 or 14 including heat absorbing means positioned in at least one of said end closure members to heat the space enclosed thereby.

22. A solar collector device comprising an elongated housing structure having a bottom wall, opposed side walls, and first and second end walls, a first glazing member mounted closing the top portion of said housing structure, a second glazing member disposed inwardly of the first glazing member forming an air space therebetween, an absorber member disposed in the housing structure between the second glazing member and the bottom wall, first and second end closure members attached respectively to said first and second end walls, each of said end closure members including means forming an enclosed space adjacent the respective end wall, means associated with the respective end walls communicating the air space between the glazing members with the enclosed spaces formed by the end closure members, and means on each of said end closure members for controllably communicating the enclosed spaces formed by the end closure members to atmosphere to limit the maximum temperature that can occur in the space between the glazing members, said solar collector including heat absorbing means positioned in at least one of said end closure members to heat the space enclosed thereby.

23. A solar collector comprising a collector housing assembly having a bottom wall, two spaced opposed side walls, and opposed end walls defining an enclosed heat collecting space therebetween, a first light conducting glazing member mounted closing the space in the housing assembly, a second light conducting glazing member mounted in the housing assembly in spaced relation to the first glazing member to form an airspace therebetween, a heat absorber member positioned in the housing assembly between said second glazing member and the bottom wall, said absorber member having an inlet, an outlet and passage means therein extending between the inlet and outlet, an opening formed in each of said opposed end walls, means forming an enclosed spaced adjacent each of said end walls, said openings communicating the airspace between said first and second glazing members with said enclosed spaces, each of said enclosed space forming means being movable between a first closed position adjacent to the respective end walls and a second open position providing access to the respective end walls, and means to controllably communicate the enclosed spaces and the space between the glazing members to atmosphere, said last named means including at least one opening through each of said means forming an enclosed space adjacent each of said end walls and other means movable relative to said openings to open and close said openings in response to predetermined temperature changes within the housing assembly.

24. The solar collector defined in claim 23 wherein said other means movable relative to each of the openings through said space forming means includes a bi-metal member having a first portion fixedly attached to each of said space forming means within the space formed thereby and a second portion extending adjacent to the respective openings therethrough for cooperation therewith.

25. A solar collector device comprising an elongated housing structure having a bottom wall, opposed side walls, and first and second end walls, a first glazing member mounted extending across the top portion of said housing assembly and being constructed of a material able to conduct solar radiation therethrough into the housing assembly, a second glazing member disposed within said housing assembly spaced below said first glazing member to form an airspace therebetween, an absorber member disposed within said housing assembly between the second glazing member and the bottom wall, said absorber member having an inlet, an outlet, and a passageway therein between the inlet and outlet for circulation of a fluid medium therebetween, each of said first and second end walls having at least one opening therethrough in position to register with the inlet and outlet of said absorber member, a pair of end closure members movably attached to the housing assembly adjacent respectively to said first and second end walls to form enclosed spaces therewith, each of said end closure members being respectively movable between closed positions adjacent to said first and second end walls and open positions providing access to said respective end walls, an opening formed in each of said first and second end walls for communicating the air space between the first and second glazing members with the enclosed spaces, and means on at least one of the end closure members to controllably communicate the space therein to atmosphere, said last named means including at least one orifice through said closure member and means on said closure member movable relative to said orifice in response to predetermined temperature changes.

26. The solar collector defined in claim 25 wherein said second glazing member is constructed of a material capable of withstanding relatively high temperatures without damage.

27. A solar collector device comprising an elongated housing structure having a bottom wall, opposed side walls, and first and second end walls, a first glazing member mounted closing the top portion of said housing structure, a second glazing member disposed inwardly of the first glazing member forming an air space therebetween, an absorber member disposed in the housing structure between the second glazing member and the bottom wall, first and second end closure members attached respectively to said first and second end walls, each of said end closure members including means forming an enclosed space adjacent the respective end wall, means associated with the respective end walls communicating the air space between the glazing members with the enclosed spaces formed by the end closure members, and means on each of said end closure members for controllably communicating the enclosed spaces formed by the end closure members to atmosphere to limit the maximum temperature that can occur in the space between the glazing members, said first and second end closure members being hingedly attached to the housing structure and being movable between closed positions adjacent to the respective end walls and open positions providing access to the respective end walls.

28. A solar collector device comprising an elongated housing structure having a bottom wall, opposed side walls, and first and second end walls, a first glazing member mounted closing the top portion of said housing structure, a second glazing member disposed inwardly of the first glazing member forming an air space therebetween, an absorber member disposed in the housing structure between the second glazing member and the bottom wall, first and second end closure members attached respectively to said first and second end walls, each of said end closure members including means forming an enclosed space adjacent the respective end wall, means associated with the respective end walls communicating the air space between the glazing members with the enclosed spaces formed by the end closure members, and means on each of said end closure members for controllably communicating the enclosed spaces formed by the end closure members to atmosphere to limit the maximum temperature that can occur in the space between the glazing members, said means on each of said end closure members including at least one opening therethrough and respective valve means normally closing each of said openings, said valve means including a temperature sensitive member movable between a first position wherein the valve means close the respective opening in the closure member when the temperature in the closure member is less than a predetermined temperature and a second position providing communication through the respective opening when the temperature in the closure member exceeds said predetermined temperature, said valve means including respective bi-metal members mounted in the end closure members, valve members attached to said bi-metal members in position to cooperate with the respective openings therein, and means to selectively adjust the positions of the bi-metal members on the respective closure members so as to adjust the predetermined temperature at which the valve means move from their closed to open positions.

29. A solar collector comprising a box-like structure having a bottom wall, opposed side walls, and spaced end walls forming a space therewithin, a first light conducting member attached to and extending across the top of said box-like structure, a second light conducting member disposed within said box-like structure in substantially parallel spaced relation from the first light conducting member forming a chamber therebetween, a heat absorber member positioned within said box-like structure between said second light conducting member and the bottom wall, said absorber member having an inlet, an outlet and passage means therebetween, an opening through at least one of the end walls for accommodating connections to said inlet and outlet, an end closure member attached to each end of the box-like structure, said end closure members forming enclosed spaces with the respective end walls, an opening in each of the end walls communicating the chamber between said first and second light conducting members with the spaces formed by the end closure members, and other means on each of said end closure members for controlling communications between the spaces formed therein with the ambient outside air, said other means including at least one orifice through each of the end closure members and respective valve means adjacent to each of said orifices to control communication therethrough, said box-like structure being constructed of mating upper and lower portions, said upper portion containing said first and second light conductive members and said lower portion containing the heat absorber member.

30. A solar collector comprising a box-like structure having a bottom wall, opposed side walls, and spaced end walls forming a space therewithin, a first light conducting member attached to and extending across the top of said box-like structure, a second light conducting member disposed within said box-like structure in substantially parallel spaced relation from the first light conducting member forming a chamber therebetween, a heat absorber member positioned within said box-like structure between said second light conducting member and the bottom wall, said abosrber member having an inlet, an outlet and passage means therebetween, an opening through at least one of the end walls for accommodating connections to said inlet and outlet, an end closure member attached to each end of the box-like structure, said end closure members forming enclosed spaces with the respective end walls, an opening in each of the end walls communicating the chamber between said first and second light conducting members with the spaces formed by the end closure members, and other means on each of said end closure members for controlling communications between the spaces formed therein with the ambient outside air, said other means including at least one orifice through each of the end closure members and respective valve means adjacent to each of the end closure members and respective valve means adjacent to each of said orifices to control communication therethrough, including heat absorbing means positioned in at least one of said end closure members to heat the space enclosed thereby.

* * * * *

UNITED STATES PATENT OFFICE
CERTIFICATE OF CORRECTION

Patent No. 4,422,443                     Dated December 27, 1983

Inventor(s)  John E. Arendt

It is certified that error appears in the above-identified patent and that said Letters Patent are hereby corrected as shown below:

Column 2, line 18, "sand" should be --- and ---.

Column 3, line 8, after "collector" and before "panel" insert --- or ---.

Column 6, line 17, "a" (first occurrence) should be --- A ---.

Column 9, line 18, "160°C" should be --- 160°F ---; line 30, "97" should be --- 96 ---.

Signed and Sealed this

Thirteenth Day of March 1984

[SEAL]

Attest:

Attesting Officer

GERALD J. MOSSINGHOFF

Commissioner of Patents and Trademarks